US006010746A

United States Patent [19]

Descoteaux et al.

[11] Patent Number: 6,010,746

[45] Date of Patent: Jan. 4, 2000

[54] IN-SITU REPAIR METHOD FOR A TURBOMACHINERY COMPONENT

[75] Inventors: Samuel S. Descoteaux, South Glastonbury; Jean-Paul I. Albert, Wolcott, both of Conn.

[73] Assignee: United Technologies Corporation, Hartford, Conn.

[21] Appl. No.: 09/017,965

[22] Filed: Feb. 3, 1998

[51] Int. Cl.[7] ........................ B05D 1/26

[52] U.S. Cl. ........................ 427/142; 427/140; 427/376.4; 427/376.7

[58] Field of Search ........................ 427/140, 142, 427/376.4, 376.7

[56] References Cited

U.S. PATENT DOCUMENTS

| | | | |
|---|---|---|---|
| 3,904,789 | 9/1975 | Speirs et al. | 427/253 |
| 4,004,047 | 1/1977 | Grisik | 427/142 |
| 5,069,836 | 12/1991 | Werner et al. | 427/140 |
| 5,254,413 | 10/1993 | Maricocchi | 427/142 |
| 5,334,417 | 8/1994 | Rafferty et al. | 427/142 |

OTHER PUBLICATIONS

Green (Editor), Perry's Chemical Engineers' Handbook, 6th Edition. pp. 9–54 –9–59, (no month) 1984.

*Primary Examiner*—Shrive Beck
*Assistant Examiner*—Kirsten A. Crockford
*Attorney, Agent, or Firm*—Kenneth C. Baran

[57] ABSTRACT

The invention is a method for repairing a protectively coated, locally damaged turbomachinery vane without removing the vane from its parent turbomachinery module. The method includes applying a diffusible coating precursor to the damaged region of the vane and diffusing the coating precursor into the vane in the presence of a nonreactive atmosphere. The nonreactive atmosphere is confined to a chamber that contains the damaged vane, the chamber being bounded in part by the turbomachinery module itself. A conventional stress relief machine is used to heat only the damaged region of the vane to a temperature sufficient to promote diffusion of the precursor into the vane. The method uses equipment and supplies that are routinely available or easily fabricated from common, inexpensive materials. Use of the method avoids the expense and delay of removing the vane from its parent module.

13 Claims, 3 Drawing Sheets

10
70
28
18
14
14
14
14
22
22
22
22
60
12
16
12
16
12
16
12
16
62
36
32
26

52
66
64
58
64
76
64
58
48
50
46
56
4-4
64
28
16

48
50
42
16
38
44
46

IN-SITU REPAIR METHOD FOR A TURBOMACHINERY COMPONENT

TECHNICAL FIELD

This invention pertains to the repair of localized damage to turbomachinery components and in particular to an in-situ method of repairing localized damage to turbomachinery blades and vanes.

BACKGROUND OF THE INVENTION

Turbomachines such as gas turbine engines have one or more turbine modules each of which includes a plurality of blades and vanes for exchanging energy with a working medium fluid. Because the blades and vanes of a turbine module operate in a hostile, high temperature environment, they are typically made of a high strength, temperature tolerant substrate material and coated with a damage resistant protective coating. Despite the presence of the protective coating, the blades and vanes are nevertheless susceptible to localized burning, cracking, erosion, sulfidation, oxidation and other types of damage. The damage may be confined to the coating, or may breach the coating and extend into the substrate.

When it is necessary to repair a locally damaged component, such as a blade or vane, it is common practice to first remove the damaged component from the turbine module. The damaged component is repaired by first abrading away the locally damaged material and applying a coating precursor to the abraded region. The component is then placed in a diffusion furnace and the furnace is flooded with a nonreactive gas such as argon. The component is heated to a predefined temperature for a predetermined time so that the coating precursor diffuses into the component. The repaired component is subsequently reinstalled in the turbine module and the module is returned to service.

Although the above described repair procedure is highly effective, the preliminary step of removing the damaged component from its parent module often entails substantial disassembly of the module, making the repair inordinately time consuming and expensive. Nevertheless, module disassembly and component removal is a widely accepted practice because an entire turbine module is far too large to fit into most commercially available diffusion furnaces. Even if a large enough furnace were available, the sheer weight and bulk of a turbine module would complicate the task of moving the module into and out of the furnace.

The expense and delay of module disassembly may be avoided by conducting an in-situ repair of localized damage to turbine blades and vanes. In-situ repair is feasible when the damaged component is reasonably accessible to a repair technician without removing the component from the module. An existing in-situ repair method is similar to is the method describe above except that the diffusion step is dispensed with. Instead, the in-situ method relies on normal engine operational temperatures to diffuse the coating precursor into the damaged component after the module has been returned to service. Experience has shown, however, that the durability of the resultant coating may be unsatisfactory because the engine operational temperatures are too low and too transient to thoroughly diffuse the coating precursor into the damaged component. Moreover, attempted diffusion of the precursor takes place in an oxygen bearing atmosphere, rather than in an inert atmosphere, further jeopardizing the durability of the resultant coating.

In view of these shortcomings, an improved method of repairing localized damage to blades, vanes and other turbomachinery module components is sought.

SUMMARY OF THE INVENTION

According to the invention, an in-situ repair of a locally damaged turbomachinery component is conducted inside a chamber bounded in part by the parent turbomachinery module itself. The chamber is filled with a nonreactive atmosphere, and a coating precursor is diffused into the locally damaged region of the component in the presence of the nonreactive atmosphere.

According to one aspect of the invention, the damaged component resides within an axially extending annulus of the turbomachinery module, the chamber boundaries are defined in part by an outer case assembly and an inner drum of the module, and the annulus inlet and discharge are blocked to impede undesirable leakage of the nonreactive atmosphere out of the chamber. According to another aspect of the invention, the coating precursor is diffused into the damaged component by locally heating the component, in the vicinity of the damaged region, to a predefined temperature for a predetermined time interval and subsequently reducing the temperature gradually to prevent cracking of the diffused coating.

The primary advantage of the invention is that it yields a high quality, permanent repair without the considerable expense and time delay of module disassembly. A related advantage of the repair is that it can be conducted with equipment that is readily available or easily and inexpensively fabricated.

The foregoing features and advantages and the method of the invention will become more apparent in light of the following description of the best mode for carrying out the invention and the accompanying drawings.

BEST MODE FOR CARRYING OUT THE INVENTION

Figure 1:
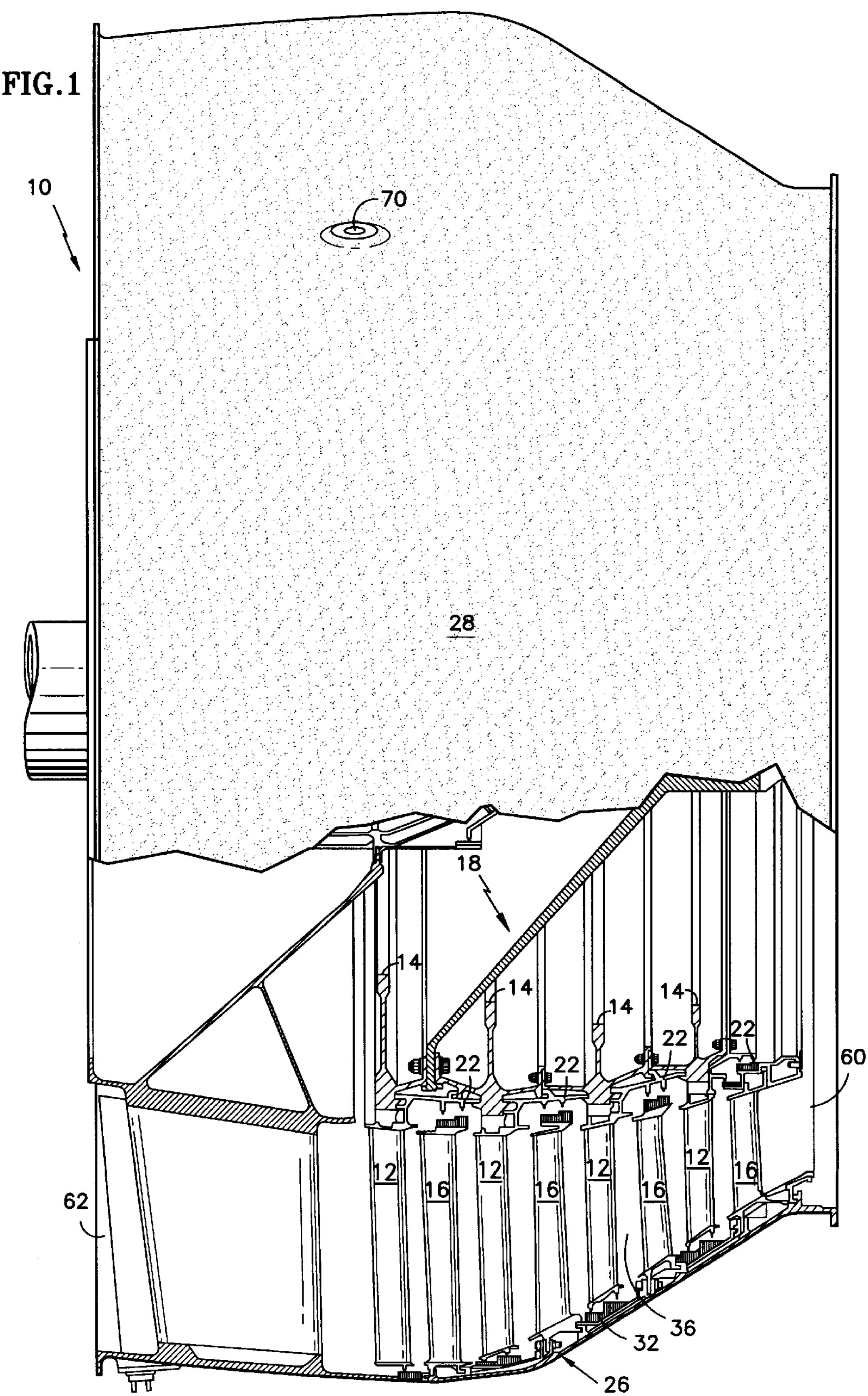
FIG. 1 is a schematic, cross sectional side view of a turbine module for a commercial aircraft gas turbine engine.

Referring to FIG. 1, a turbine module 10 for a gas turbine engine includes one or more arrays of circumferentially distributed blades 12 that extend radially from hubs 14, and one or more stages of circumferentially distributed stator vanes 16 axially offset from the blades. The blades and vanes, which may be generically referred to as fluid reaction elements, are made of a substrate material comprising a nickel base alloy. A protective coating is applied to the substrate to protect it from oxidation, corrosion and thermal damage. One widely used class of protective coatings is the class of aluminide coatings. Another widely used class of coatings is the class of MCrAlY coatings comprising nickel and/or cobalt (M) chromium (Cr) aluminum (Al) and yttrium (Y). For blades and vanes that operate at particularly high temperatures, the protective coating may also include a ceramic thermal barrier layer that overlays the metallic (aluminide or MCrAlY) layer.

The turbine module has an inner drum 18 comprising inner airseal rings 22 that extend axially between adjacent hubs 14. The module also has an outer case assembly 26 comprising a case 28 with one or more outer airseal rings 32 affixed thereto outboard of each blade array. The blades and vanes extend across an annulus 36 between the case assembly and the drum.

Figure 2:
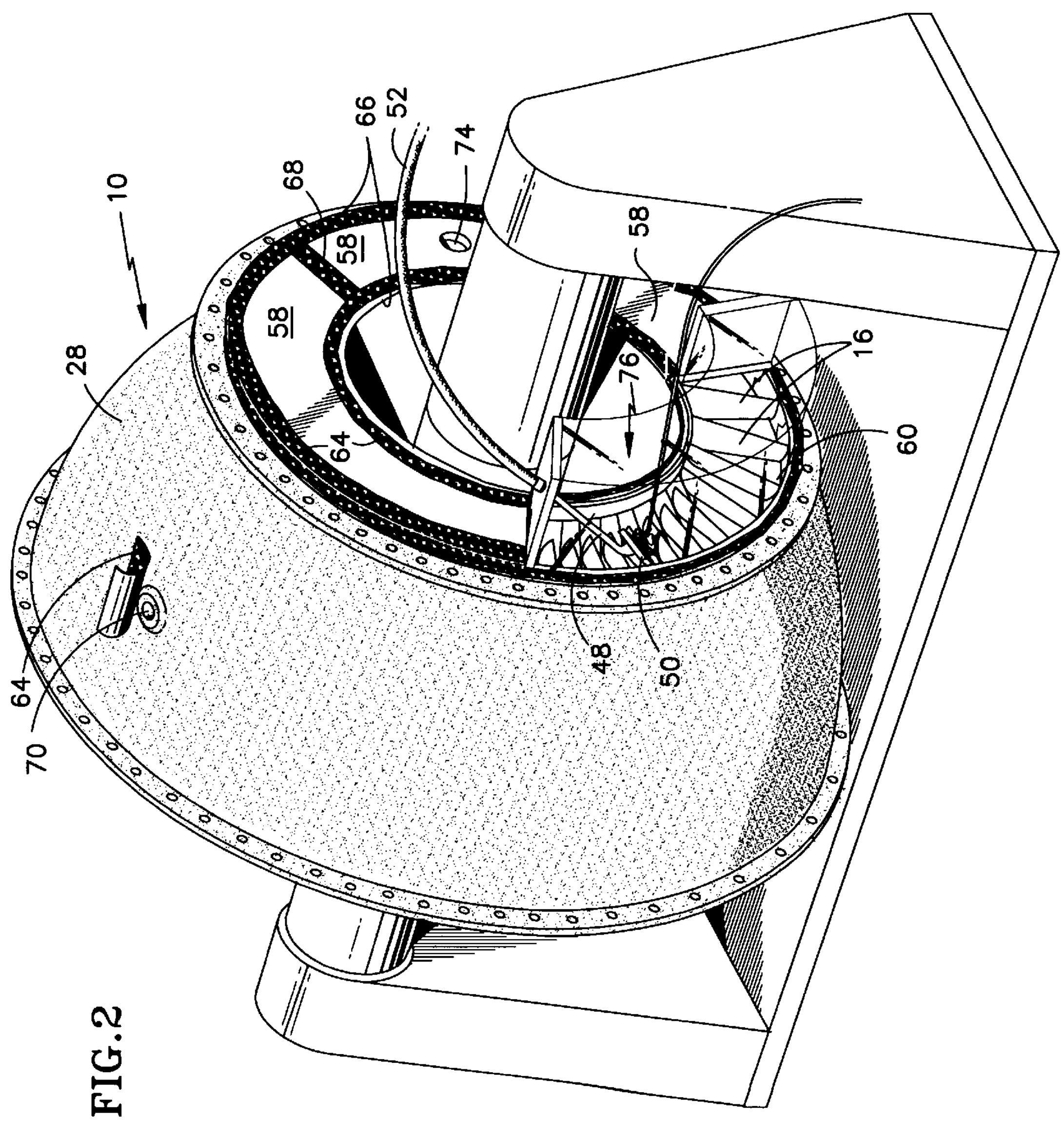
FIG. 2 is a perspective view of a turbine module similar to that of FIG. 1 showing a number of arcuate panels and a viewing cover blocking the inlet end of an annulus that extends axially through the module.
Figure 3:
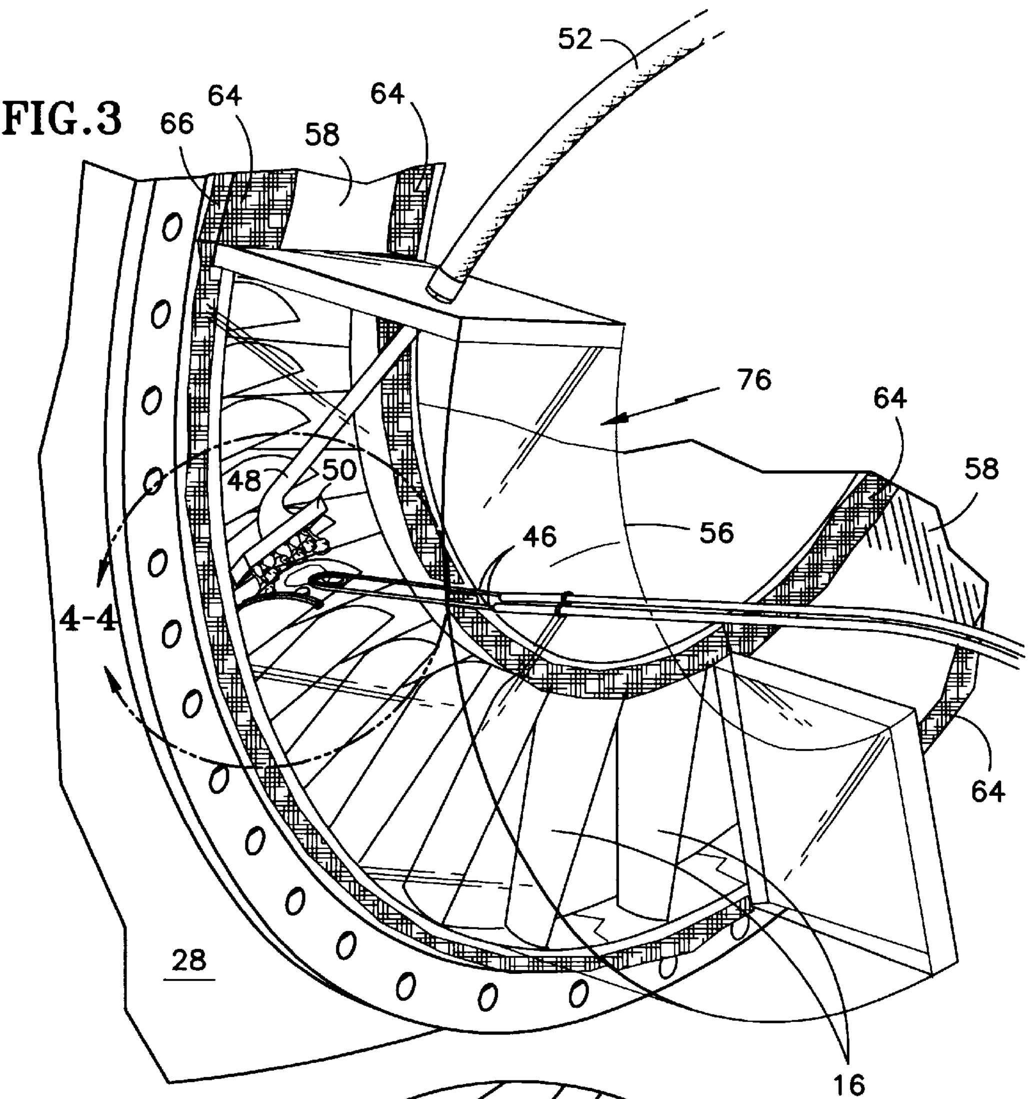
FIGS. 3 and 4 are enlarged views of the module of FIG. 2 showing details of the repair setup according to the present invention.
Figure 4:
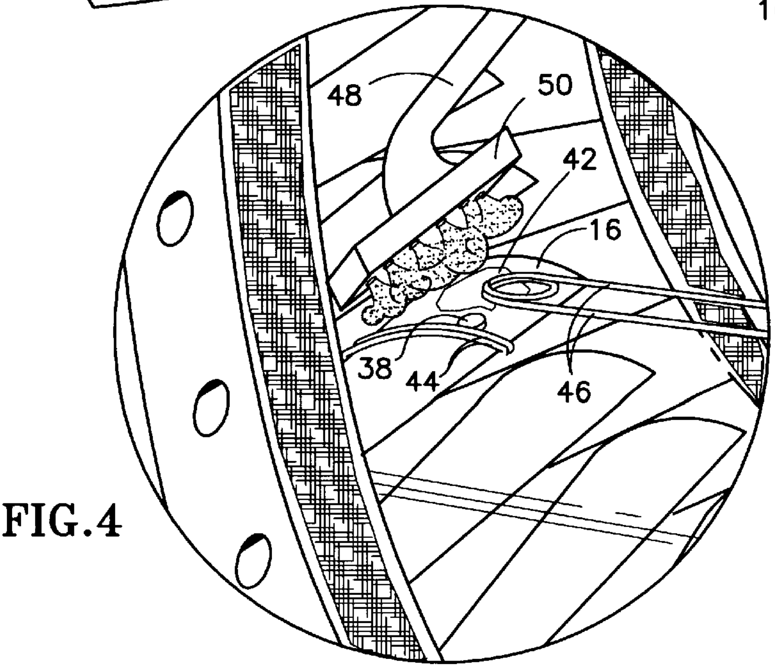

Referring now to FIGS. 2–4, local damage to a turbine module component, such as a vane 16, may be repaired in-situ by first separating the module from the engine, as seen in FIG. 2, so that the damaged vane (e.g. one of the vanes visible in FIG. 2) is accessible to a repair technician. The vane is prepared for repair by abrading away the locally damaged material, which may be confined to the coating or may include some of the substrate as well. The vane is then inspected for deep cracks, which are not repairable by the present method. Since the vane is hollow, further inspections are conducted to ensure that the removal of damaged material has not reduced the wall thickness of the vane below a tolerable minimum dimension. As a final preparatory step, the vane is cleaned to remove any residual foreign matter from its surface.

A thermocouple 38 (FIG. 4) is temporarily affixed to the vane in the vicinity of the locally damaged region 42. The thermocouple may be attached using lock wire 44, clamps or any other suitable means. The thermocouple is used to monitor the temperature at which a coating precursor is later diffused into the vane. Since heat will be applied only locally to the vane, the thermocouple must be positioned near enough to the damaged region to yield a representative temperature reading.

A diffusible coating precursor is applied to the locally damaged region of the vane. For vanes having an aluminide or MCrAlY metallic coating, the coating precursor is ideally one comprising aluminum and may be in any suitable form. One suitable form is a slurry comprising aluminum and silicon particles suspended in an aqueous solution of inorganic salts. Such a slurry is available from Sermatech International, Inc. of Limerick, Pa. under the name SermaLoy J. The slurry is cured for approximately 15 minutes at a temperature between about 150 and 200 degrees Fahrenheit. Adequate curing temperature is achieved by locally heating the damaged region with a heat lamp or heat gun. The curing temperature is monitored with a touch probe thermometer of the type well known in the welding arts. An alternative to the coating slurry is a coating tape produced from powder, such a tape being available from Coating Applications, Inc. of Cincinnati Ohio under the name CAI 201 M.

A heating coil 46 is positioned so that the damaged region 42 can be locally heated to the temperature required for diffusion. In the illustrated setup, coil 46 is the heating coil of a conventional stress relief machine (not shown) of the type customarily used to relieve residual stresses at weld joints. To prevent electrical arcing and attendant damage to the vane, the coil is positioned so that it does not contact any part of the module 10. A gas backup nozzle 48 of the type commonly used in the welding arts is also positioned with its head 50 proximate to the damaged region 42 of the vane. The gas backup nozzle is connected to a gas supply line 52 which, in turn, is connected to a supply (not shown) of a nonreactive gas, preferably argon. Ideally the backup nozzle is oriented so that gas issuing from the nozzle head flows over and envelops the damaged region of the vane during the subsequent diffusion cycle.

A chamber 56 is constructed so that at least the damaged region 42 of the vane is contained within the chamber. The radially outer and inner boundaries of the chamber are defined in part by the outer case assembly 26 and in part by the inner drum 18. The forward axial extremity of the chamber is defined by at least one arcuate heat tolerant panel, such as representative plastic panels 58, secured to the module 10 to block the inlet end 60 of the annulus 36. Likewise, the aft axial extremity of the chamber is defined by one or more arcuate panels, similar to panels 58, secured to the aft end of the module to block the discharge end 62 of the annulus 36. The panels are affixed to the module by tape 64 that not only secures the panels to the module, but also seals the seams 66 between the module and the radially inner and outer edges of the panels. The seams 68 between circumferentially adjacent panels are also taped as are any apertures or ports such as inspection port 70 in the case 28. A pressure relief vent 74 is provided so that excess gas can escape from the interior of the chamber during the diffusion cycle. The vent may be a pre-existing opening in the module such as inspection port 70 that is left unsealed, or the vent may be a nonpre-existing opening such as vent 74 shown in the Figure. Preferably the vent is remote from the vane being repaired to minimize the likelihood that oxygen will infiltrate into the chamber and be present in the vicinity of the damaged region during the diffusion cycle.

In principle, arcuate panels 58 could be used to block the entirety of both the inlet and discharge ends 60, 62 of the annulus 36. However the preferred practice is to install a transparent viewing cover or viewing box 76 to block a sector of the annulus near the damaged component. The viewing box may be a multiple piece article so that it can be conveniently secured to the turbine module after the thermocouple 38, gas supply line 52, gas backup nozzle 48 and heating coil 46 have been positioned. The viewing box, like the panels 58, are affixed to the module by tape 64. Whether or not a transparent viewing box is used, any apertures, such as the access openings for the thermocouple leads, the gas supply line, and the heating coil are also masked with tape 64. The viewing box allows the repair technician to visually confirm that the positions of the thermocouple, gas backup nozzle and heating coil have not been disturbed during installation of the cover. The viewing box also allows the technician to observe the progress of the diffusion cycle. For example it may be desirable to monitor the purity of the nonreactive atmosphere. Atmospheric purity may be monitored by passing an electrical current through a light bulb filament positioned in the interior of the chamber. As long as the nonreactive character of the atmosphere is not compromised the filament will remain intact. However if the local atmosphere becomes oxygen contaminated, the filament will almost immediately burn out, signaling the repair technician to take corrective action.

A nonreactive atmosphere such as argon gas is introduced into the chamber 56 through the gas backup nozzle 48. The argon displaces the air in the chamber until the atmosphere inside the chamber is substantially pure argon. Once the air is purged from the chamber, the vent 74 may be sealed and the flow of argon into the chamber may be discontinued. The subsequent diffusion cycle may then be carried out in a stagnant argon atmosphere. More preferably, the argon atmosphere is continually replenished with fresh argon issuing from the gas backup nozzle, with excess argon being vented through the pressure relief vent 74. Continual replenishment is advantageous since it compensates for any minor leaks (for example at the taped seams) that could eventually compromise the purity of a stagnant argon atmosphere. Ideally, the gas backup nozzle is positioned and oriented so that the fresh argon flows over and envelops the damaged region of the vane. Directing the argon stream over the damaged region helps to ensure the purity of the argon atmosphere in the immediate vicinity of the damaged region during the diffusion cycle.

Once an argon atmosphere has been established in the chamber, electrical power is supplied to the heating coil to heat the damaged region of the vane to a predefined temperature that causes the coating precursor to begin diffusing into the vane. The damaged region is maintained at the predefined temperature, as sensed by the thermocouple 38, for a predetermined time interval to promote thorough diffusion of the coating precursor into the vane. After the time interval has expired, power to the heating coil is reduced in a controlled manner so that the temperature of the damaged region decreases gradually from the predefined temperature to a lower, target temperature. The gradual temperature reduction precludes thermally induced cracking of the newly diffused coating. Once the diffusion of the coating precursor is complete, the argon atmosphere is unnecessary and air can be allowed to re-enter the chamber. In practice, the argon atmosphere is maintained until the temperature of the vane has decreased to the target temperature.

For a vane made of a nickel base alloy and coated with an aluminide coating, a predefined diffusion temperature of between 1575 and 1625 degrees Fahrenheit, and a predetermined time interval of about two hours have been found to be effective. After expiration of the two hour interval, coating integrity is assured by reducing the temperature of the damaged region in 100 degree increments every ten minutes until a target temperature of about 600 degrees Fahrenheit is achieved. Power to the heating coil may then be completely interrupted and the temperature can decay to ambient temperature without jeopardizing the integrity of the new coating.

The advantages of the above described repair method can now be fully appreciated. By using the turbine module itself, rather than a conventional diffusion furnace, to confine the damaged component in a nonreactive atmosphere, the delay and expense of removing the damaged component from the turbine module can be avoided. Much of the equipment necessary to conduct the repair, such as the gas backup nozzle, stress relief machine, touch probe thermometer and thermocouple are routinely available in most facilities where welding is practiced. Other articles, such as the arcuate panels and viewing box, are easily constructed from readily available, inexpensive materials. Moreover the repair is permanent and of high quality.

Various changes and modifications can be made without departing from the invention as set forth in the accompanying claims. For example, the method's applicability is not limited to turbine vanes, but can also be applied to a turbomachine's compressor vanes. Although the method has been described in the context of repairing a turbine vane, it may be possible to use the method for repairing turbine blades as well. One constraint on using the method for repairing blades arises because the local heating of the damaged region could introduce residual stresses into the blade. Since the blades rotate about the turbomachine's axis, they are far more highly stressed than the vanes during operation of the turbomachine, and the presence of residual stresses may prompt crack formation and failure of the blade. Therefore it is advisable to either relieve the residual stresses or determine that the residual stresses are tolerable before applying the method to a blade or other highly stressed component. Moreover, the presence of a ceramic thermal barrier layer over the metallic coating layer does not necessarily preclude the use of the disclosed method to refurbish the metallic layer. This is particularly true if the ceramic layer is repairable in-situ or if the operational life of the component is not significantly compromised by the localized absence of the ceramic layer.

We claim:

1. A method for repairing a coated turbomachinery component disposed radially between an outer case and an inner drum of a turbomachinery module, the method comprising:

applying a diffusible coating precursor to a locally damaged region of the component;

constructing a chamber bounded in part by at least one of the outer case and the inner drum so that at least the damaged region is contained within the chamber;

introducing a nonreactive atmosphere into the chamber; and diffusing the coating precursor into the component in the presence of the nonreactive atmosphere.

2. The method of claim 1 wherein an annulus extends axially through the module from an inlet end to a discharge end, and the step of constructing the chamber comprises blocking the inlet and discharge ends of the annulus to impede undesirable fluid leakage out of the chamber.

3. The method of claim 2 wherein the step of blocking the inlet and discharge ends comprises securing at least one arcuate panel to each of the ends and optionally installing a viewing cover in the vicinity of the damaged component.

4. The method of claim 1 wherein the chamber is vented and the nonreactive atmosphere is continually replenished.

5. The method of claim 4 wherein the nonreactive atmosphere is replenished by directing a stream of nonreactive gas over the damaged region of the component during the step of diffusing the coating precursor.

6. The method of claim 1 wherein the coating precursor is in the form of a slurry.

7. The method of claim 1 wherein the nonreactive atmosphere comprises argon gas.

8. The method of claim 1 wherein the turbomachinery module is a turbine module and the component is a fluid reaction element.

9. The method of claim 8 wherein the fluid reaction element is a stator vane.

10. The method of claim 1 wherein the step of diffusing the coating precursor comprises locally heating the component, in the vicinity of the damaged region, to a predefined temperature, maintaining the damaged region at the predefined temperature for a predetermined time interval and, after expiration of the time interval, reducing the temperature to a target temperature gradually enough to prevent cracking of the diffused coating.

11. The method of claim 10 wherein a heating coil is used to locally heat the component.

12. The method of claim 10 wherein the component is made of a substrate material selected from the group consisting of nickel base alloys and has an original protective coating selected from the class consisting of aluminide coatings and the coating precursor comprises aluminum.

13. The method of claim 10 wherein the component is made of a substrate material selected from the group consisting of nickel base alloys and has an original protective coating selected from the class consisting of aluminide coatings, the coating precursor comprises aluminum the predefined temperature is between 1575 and 1625 degrees Fahrenheit, the predetermined time interval is approximately two hours, the temperature is reduced in increments of approximately 100 degrees Fahrenheit every ten minutes, and the target temperature is approximately 600 degrees Fahrenheit.

* * * * *